United States Patent [19]

Strömberg

[11] 4,194,526
[45] Mar. 25, 1980

[54] NOZZLE REGULATING DEVICE

[76] Inventor: Thore Strömberg, Nordengatan 5, 602 36 Norrköping, Sweden

[21] Appl. No.: 847,693

[22] Filed: Nov. 1, 1977

[30] Foreign Application Priority Data

Nov. 4, 1976 [SE] Sweden .............................. 76122670

[51] Int. Cl.$^2$ .............................................. G05D 9/04
[52] U.S. Cl. ...................................... 137/498; 137/356; 137/395; 137/503; 137/DIG. 8
[58] Field of Search ............... 137/183, 187, 395, 396, 137/498, 503, DIG. 8

[56] References Cited

U.S. PATENT DOCUMENTS

| 1,581,454 | 4/1926 | Larson ............................. 137/503 X |
| 3,766,933 | 10/1973 | Nicholson ...................... 137/DIG. 8 |
| 3,998,736 | 12/1976 | Greenleaf ......................... 137/396 X |

*Primary Examiner*—Robert G. Nilson
*Attorney, Agent, or Firm*—Neil F. Markva

[57] ABSTRACT

A nozzle regulating device connected to a suction hose automatically regulates the suction at a nozzle. The suction will be a maximum when the fluid completely covers the suction inlet of the nozzle and a minimum when the suction inlet is completely clear of the fluid. A slide valve member is operable by two pistons of different diameters slidable in respective cylinders of a housing. A first pipe section connects the suction inlet with a valve port in the housing. A second pipe section connects the suction hose with another valve port in the housing. Thus, the suction applied to the suction inlet from the hose is under the control of the slide valve member. A pipe connects the drive space in the larger diameter cylinder housing to the first pipe section, and another pipe connects the drive space in the other cylinder housing to the second pipe section. On covering the suction inlet by fluid, with suction applied to the outer end of the second pipe section, the opening of the slide valve increases and on clearing of the suction inlet the opening of the slide valve is reduced.

10 Claims, 2 Drawing Figures

NOZZLE REGULATING DEVICE

SUMMARY OF THE INVENTION

This invention relates to a nozzle device which may be connected to a suction hose for removing fluid from a vessel. The nozzle device automatically regulates the suction so that it is at a maximum when the vessel contains enought fluid to completely cover the inlet means of the nozzle and a minimum when the inlet means is clear of the fluid.

BRIEF DESCRIPTION OF THE DRAWINGS

The device which is the subject of this invention has the form and the characteristics which are evident from the appended patent claims. Embodiments of the invention are shown, by way of example, in the accompanying drawings in which:

DETAILED DESCRIPTION

Figure 1:
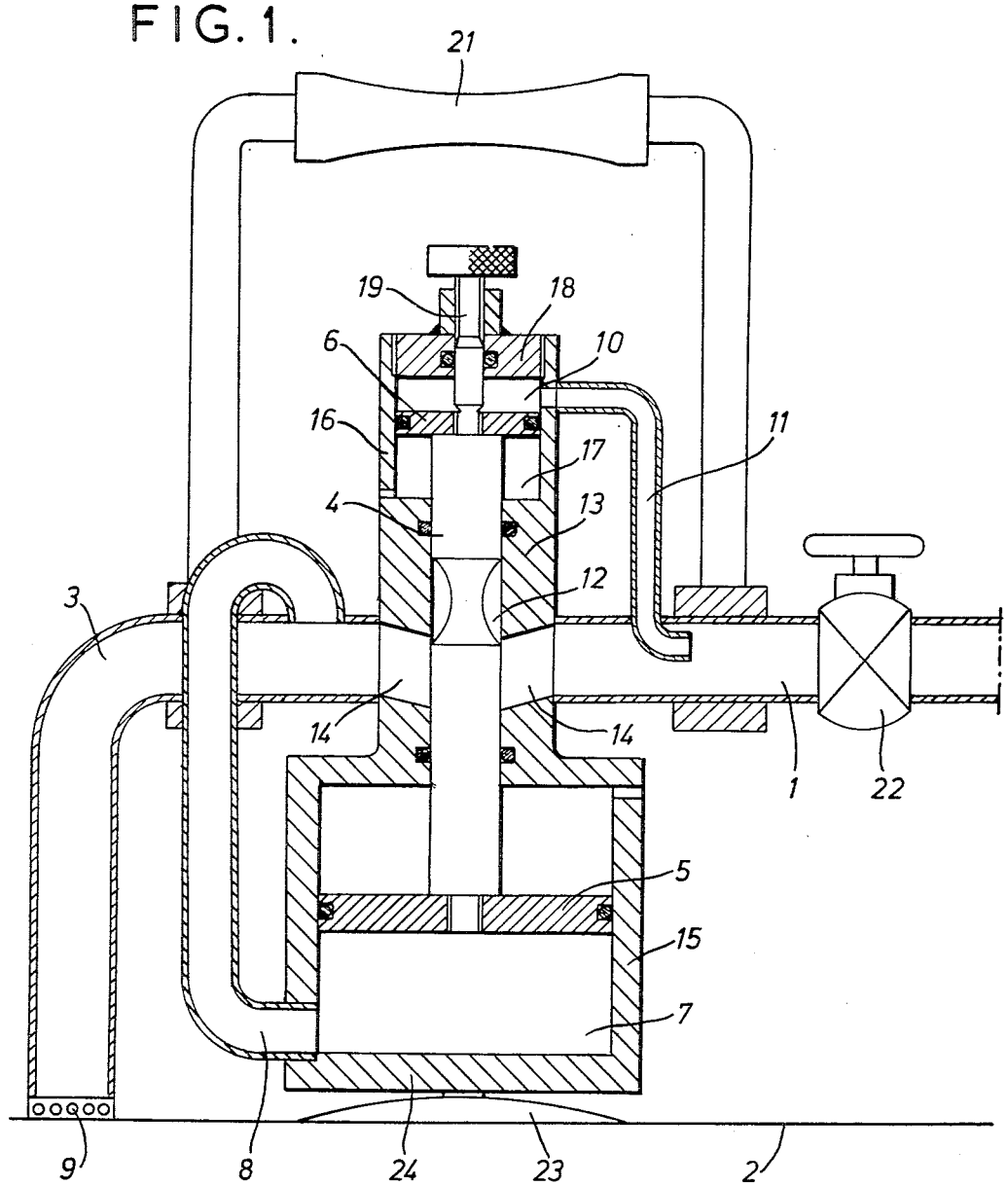
FIG. 1 shows a vertical section of one embodiment of a device constructed in accordance with the invention.

Exemplary Embodiment I (FIG. 1)

An interconnecting pipe 1, 3 to a nozzle with lateral suction inlets 9 is connected, by means of a coupling which is not shown, to a suction hose which is also not shown and is used to remove the fluid drawn up by suction. A housing 13 containing a circular slide valve stem 4 at right angles to the interconnecting pipe 1, 3 is fitted in said interconnecting pipe 1, 3. The housing 13 communicates with the interconnecting pipe 1, 3 via diametrically opposite openings 14. The ends of the valve stem 4 are connected to respective servo pistons 5 and 6. Servo piston 5 has a considerably greater diameter than servo piston 6. The pistons 5 and 6 are each free to slide with a good seal in cylinders 15 and 16, respectively. Cylinders 15 and 16 are co-axial with the valve stem 4.

The drive space 7 on the opposite side of piston 5 to stem 4 and in the larger cylinder 15 is connected via a pipe 8 to pipe section 3 between housing 13 and suction inlets 9. The drive space 10 on the opposite side of piston 6 to stem 4 and in the smaller cylinder 16 is connected via a pipe 11 to pipe section 1 which is connected to the suction hose via valve 22. The circular stem 4 is encircled by a channel 12 having a profile in the form of a segment of a circle and a width which is very nearly equal to the diameter of the openings 14. The channel 12 is located in such a way that the distance from the smaller piston 6 to the channel 12 is equal to the distance from the bottom end 17 of the smaller cylinder 16 to the nearest edge of the openings 14. The head 18 of the smaller cylinder 16 is equipped with an adjustment screw 19 for limiting the stroke of the piston 6.

When the nozzle is to be used for draining a vessel with a flat bottom 2, e.g. a plane collecting tray, it is suitable to equip the outer side of the head 24 of the larger cylinder with a rubber sucker 23 of well known shape arranged to hold the suction inlets 9 near the bottom of the vessel 2.

Figure 2:
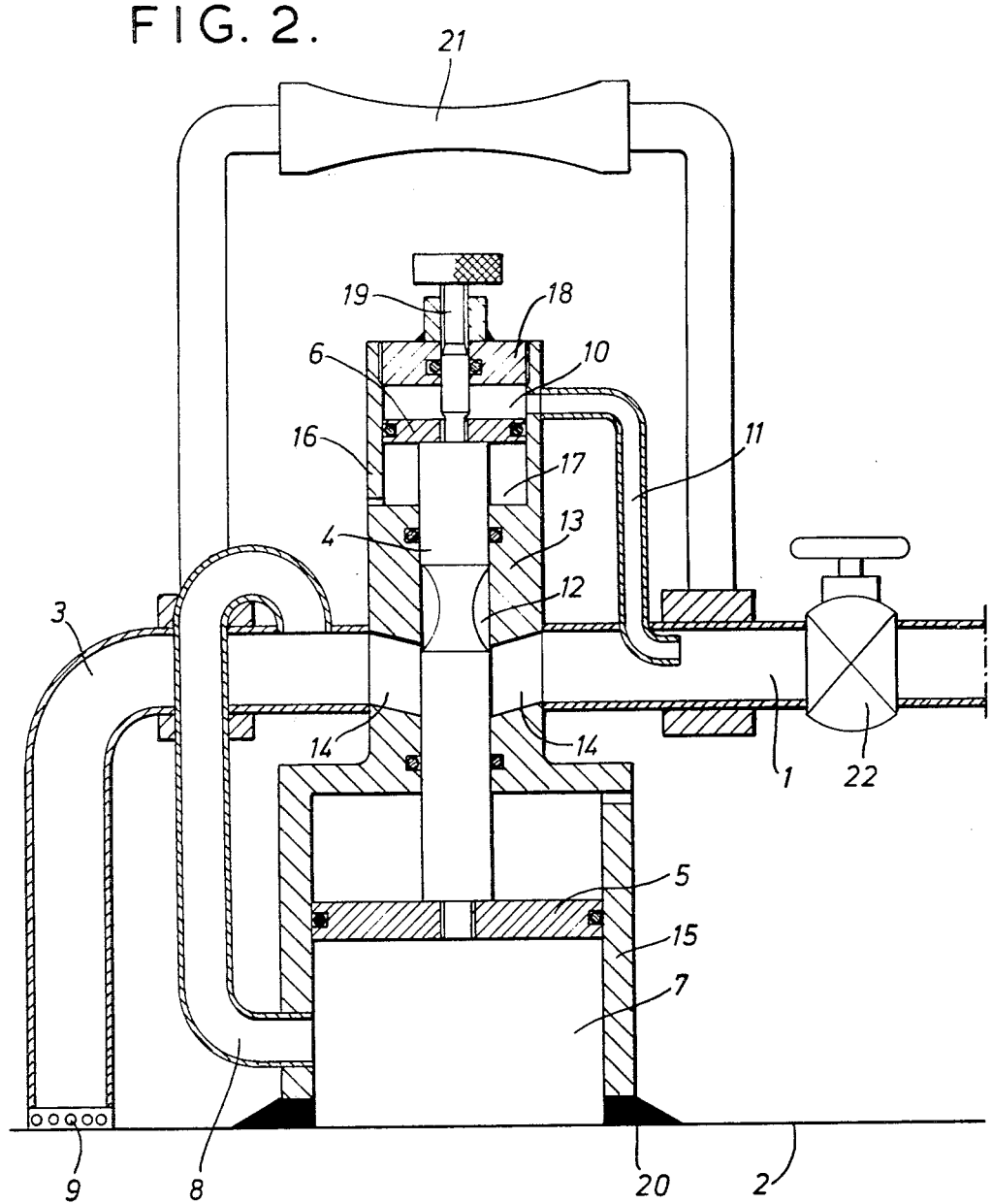
FIG. 2 shows a vertical section of another embodiment of a device constructed in accordance with the invention.

Exemplary Embodiment II (FIG. 2)

This embodiment differs from embodiment I only in that the larger cylinder 15 is not provided with a head but is, at its outer edge, equipped with an elastic rubber lip sealing strip 20 which faces outwards so that the cylinder 15 together with the lip sealing strip 20 will function in the same manner as the sucker 23 in embodiment I but with the difference that the suction will depend on the quantity of fluid, with the suction being greatest when the suction inlets 9 are completely covered with fluid and least when the suction inlets 9 are completely clear of the fluid. By arranging a suitable relationship between the total area of the suction inlets 9 and the diameter of the larger cylinder 15 it is possible to arrange for the suction means to become free when no fluid is left to be removed.

It has been found advantageous to equip the device with a handle 21 pivoted about the two sections of the interconnecting pipe 1, 3 and to equip the section 1 of the pipe with a stop valve 22.

Both embodiments I and II function in the main in the same manner regarding regulation of the suction. When the suction inlets 9 are covered by fluid, the depression in the drive space 7 of cylinder 15 will increase, the piston 5 will be pulled downwards and thus draw the stem 4 with it so that the area of opening of the encircling channel 12 increases. When the suction inlets 9 are clear, the depression in the drive space 7 is reduced and the piston 6 draws the stem 4 upwards so that the area of opening is reduced. The reduction in the area of opening can be limited by means of the adjustment screw 19 so that it may never be completely closed which would cause the mechanism to cease to function since there would be no depression reaching the drive space 7 of the cylinder 15 from the section of the pipe 1.

Although only two embodiments are shown, and described above, others are possible within the scope of the invention.

I claim:

1. A nozzle regulating device for automatically regulating the suction drawn by a suction hose at a nozzle having suction inlet means for drawing up fluid from a vessel, said nozzle regulating device comprising:
    (a) a housing defining two cylinders with differently sized diameters and having openings located between said cylinders,
    (b) said housing openings being interconnected to first and second pipe sections which connect to said suction inlet means and said suction hose, respectively,
    (c) a valve stem encircled by a channel for interconnecting said housing openings and said stem being fitted to slide freely and be in sealing contact with a central bore in said housing,
    (d) a servo piston disposed at each of the ends of said valve stem,
    (e) one said piston having a considerably larger diameter than the other said piston,
    (f) each said servo piston being fitted with a sliding seal in said cylinders which are co-axial with the valve stem,
    (g) a first drive space located in the larger cylinder and on the side of the larger servo piston opposed to the valve stem,
    (h) first pipe means for connecting the first drive space to said first pipe section which couples the suction inlet means to one of the housing openings,
    (i) a second drive space located in the smaller cylinder and on the side of the smaller servo piston opposite the valve stem, and (j) second pipe means for connecting the second drive space to said second pipe section which couples the suction hose to the other one of the housing openings, (k) said servo piston being effective to cause the valve stem to slide within the housing bore and increase the opening area of the encircling channel within the housing openings in response to any change in pressure in the suction hose and first drive space on covering of the suction inlet means with said fluid in the vessel and reduce said opening area on clearing of fluid from said suction inlet means.

2. A nozzle regulating device in accordance with claim 1, wherein
the distance, between the bottom of the smaller cylinder and the nearest edges of the housing openings, is equal to the distance between the smaller piston and the encircling channel encircling the slide valve stem.

3. A nozzle regulating device in accordance with claim 1, wherein
the encircling channel encircling the slide valve stem has a profile in the form of a segment of a circle.

4. A nozzle regulating device in accordance with claim 1, wherein
the head of the smaller cylinder is equipped with an adjustment screw for limiting the outward stroke of the smaller piston.

5. A nozzle regulating device in accordance with claim 1, wherein
a bottom of the larger cylinder is equipped with at least one sucker device for a suction hold on a flat bottom of said vessel holding the fluid being removed therefrom.

6. A nozzle regulating device in accordance with claim 1, wherein
the larger cylinder has no bottom and is equipped on its outer edge with an elastic rubber lip sealing strip.

7. A nozzle regulating device in accordance with claim 6, wherein
the maximum opening area through the channel of the slide valve stem is considerably less than that of the first and second pipe sections.

8. A nozzle regulating device in accordance with claim 1, wherein
the second pipe section is equipped with a stop valve located between an end for attaching to the suction hose and the location of the second pipe means which is connected to the second drive space of the smaller cylinder.

9. A nozzle regulating device in accordance with claim 1, wherein
the suction inlet means has a free area that is considerably less than that of the first and second pipe sections.

10. A nozzle regulating device for automatically regulating the suction at a nozzle for drawing up fluid from a vessel, said nozzle regulating device comprising:
(a) a housing having two cylinder chambers with different diameters,
(b) a slide valve member slidably mounted in said housing,
(c) duct means through which suction can be applied to said fluid under the control of said slide valve member,
(d) said duct means comprising a first and second duct, said first duct having an inner end communicating with a first slide valve port in said housing and having an outer end provided with suction inlet means for the fluid and said second duct having an inner end communicating with a second slide valve port in said housing and having an outer end to which the suction can be applied,
(e) a first piston carried by said slide valve member and slidably mounted in that one of the aforesaid different diameter cylinder chambers which is of larger diameter,
(f) a second piston carried by said slide valve member and slidably mounted in the smaller-diameter cylinder chamber,
(g) said pistons constituting actuating means for said slide valve member,
(h) a first pipe connecting a drive space in the larger diameter cylinder chamber with the first duct, and
(i) a second pipe connecting a drive space in the smaller-diameter cylinder chamber with the second duct,
(j) the arrangement being such that on covering the inlet means by fluid, with suction applied to the outer end of the second duct, depression in the drive space in the larger-diameter cylinder chamber increases whereby the slide valve member moves in a direction to increase suction at said suction inlet means, and
(k) on clearing of said suction inlet means of said fluid, the depression in said drive space in the larger-diameter cylinder is reduced whereby the slide valve member moves in a direction to decrease suction at said suction inlet means.

* * * * *